United States Patent [19]
Anderson et al.

[11] 3,800,403
[45] Apr. 2, 1974

[54] METHOD OF MAKING A SUTURING MEMBER AND MOUNTING THE SUTURING MEMBER ON A DEVICE

[75] Inventors: Lawrence Anderson, Minneapolis; William A. Andres, Hopkins; Edith R. Artmann, Delano; Francis W. Child, Maple Plain; Una N. Swanson, Minneapolis, all of Minn.

[73] Assignee: Medical Incorporated, Minneapolis, Minn.

[22] Filed: Oct. 10, 1972

[21] Appl. No.: 296,002

[52] U.S. Cl. ............... 29/445, 29/447, 29/527.1, 264/230, 264/257, 3/1
[51] Int. Cl. ............................................. B23p 9/00
[58] Field of Search ............... 29/445, 447, 527.1; 264/230, 257; 3/1

[56] References Cited
UNITED STATES PATENTS

| | | | |
|---|---|---|---|
| 3,108,852 | 10/1963 | Olsen | 264/266 X |
| 3,125,346 | 3/1964 | Paltorak | 29/445 UX |
| 3,146,285 | 8/1964 | Munk | 264/266 |
| 3,365,728 | 1/1968 | Edwards et al. | 3/1 |
| 3,587,115 | 6/1971 | Shiley | 3/1 |
| 3,594,824 | 7/1971 | Nakib | 3/1 |
| 3,619,478 | 11/1971 | Staiger | 264/230 X |
| 3,623,212 | 11/1971 | Child | 29/445 |

*Primary Examiner*—Charlie T. Moon

[57] ABSTRACT

A suturing member and method of making the suturing member on an implantable prosthetic device, as a heart valve. The suturing member has a porous fabric cover surrounding a semi-rigid plastic core. An annular sleeve of heat shrinkable plastic material is located within the cover to hold the cover in assembled relation with the device in a manner which allows for rotation of the device after the suturing member has been attached to the tissue. The seam of the cover is located between the annular sleeve and the device. In the method of making the suturing member, the cover is located around the core and annular sleeve before it is mounted on the device. After the suturing member is mounted on the device, it is heated to cure the plastic core, bond the core to the inner surface of the cover, and heat shrink the sleeve around the device.

14 Claims, 18 Drawing Figures

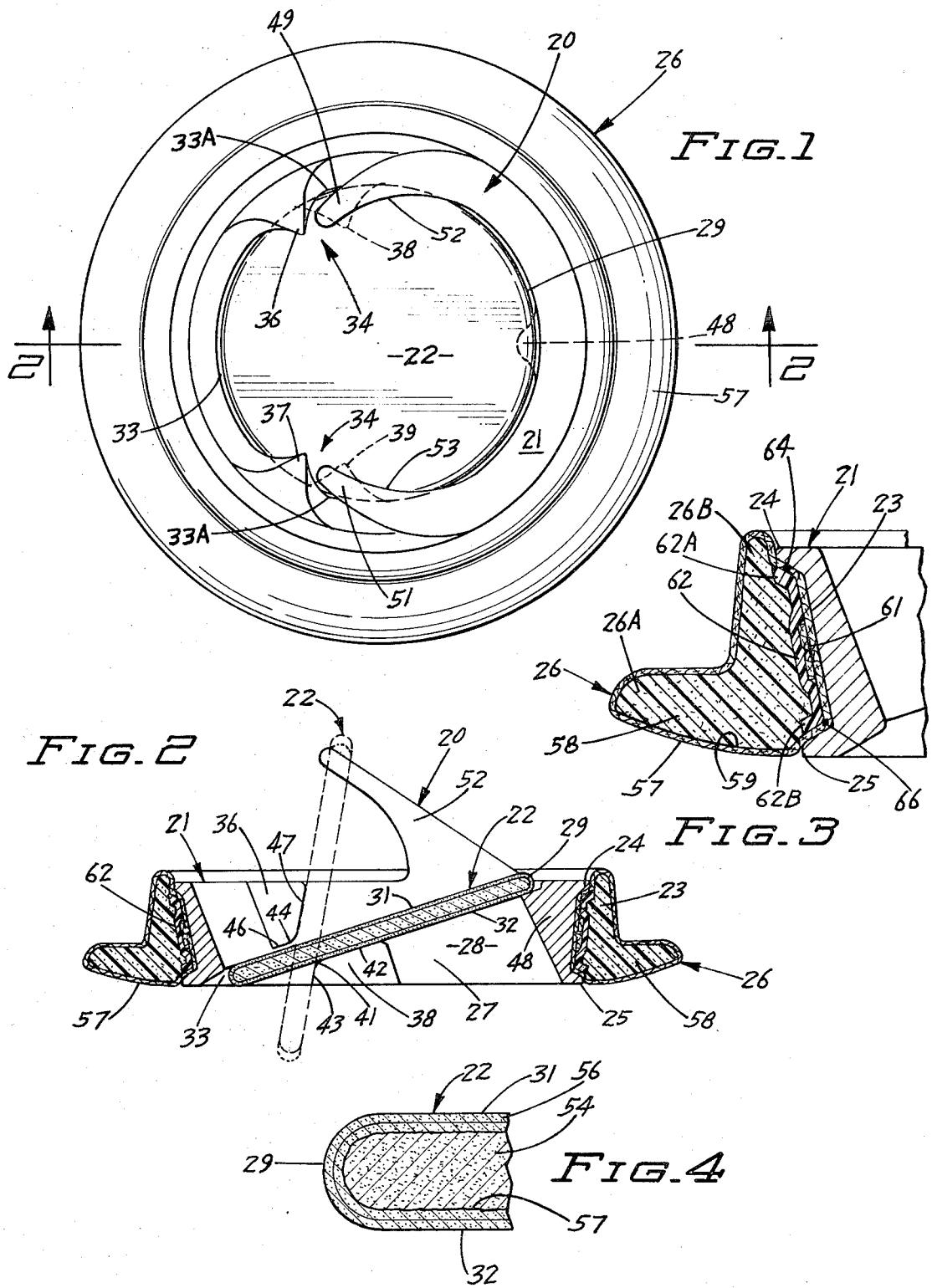

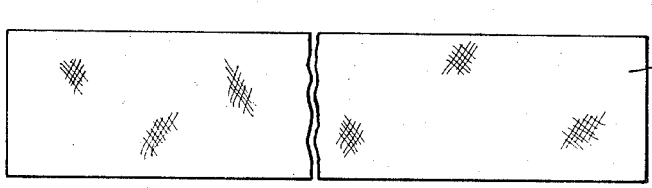
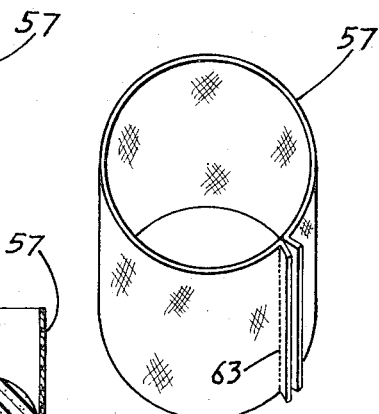
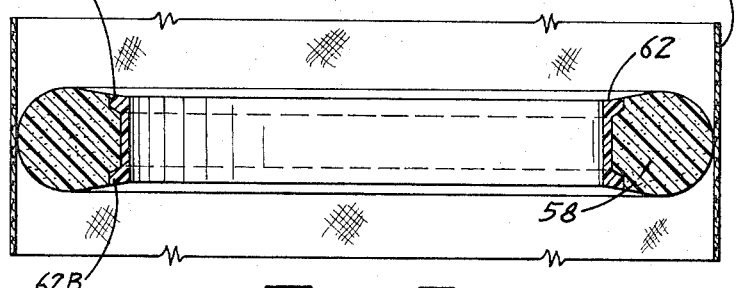
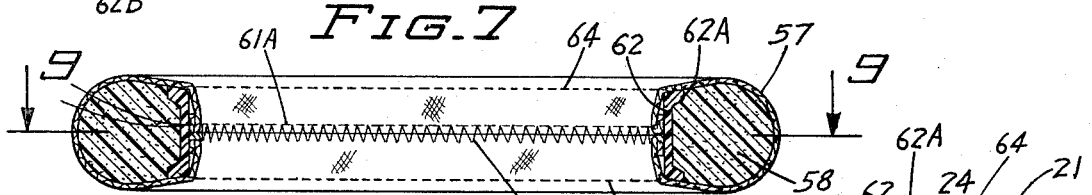
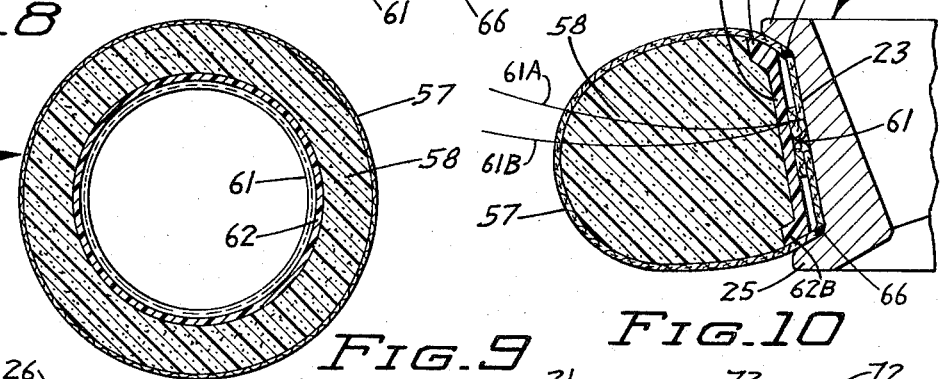
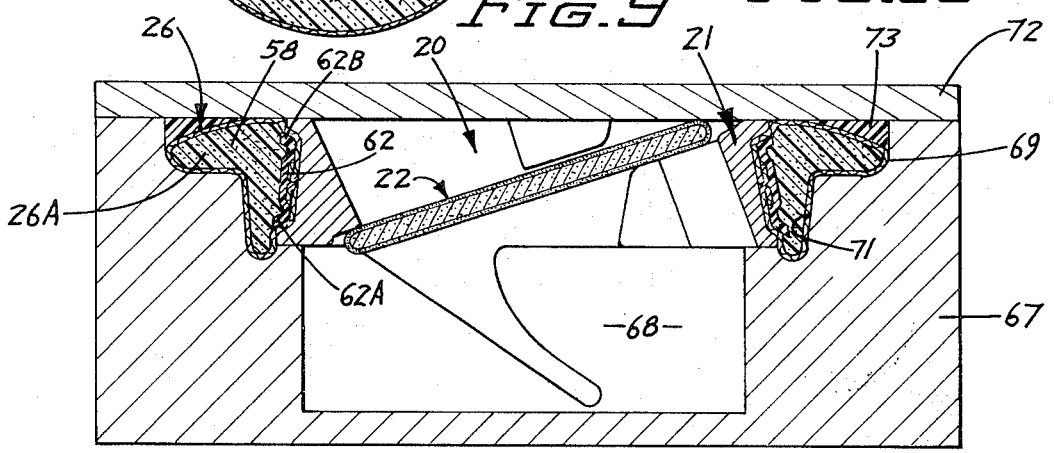

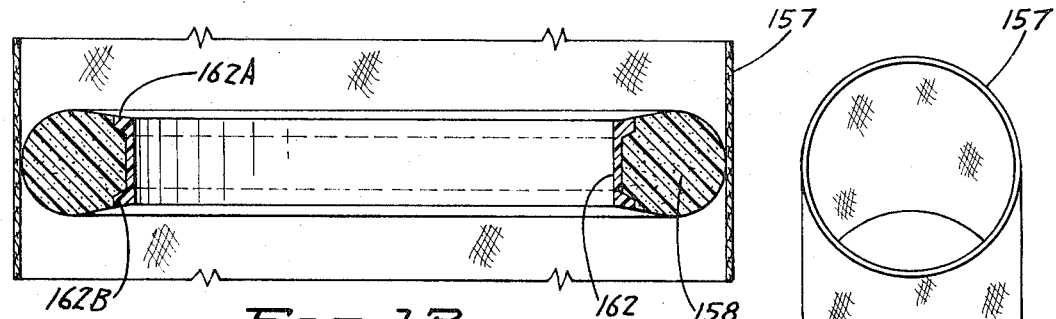
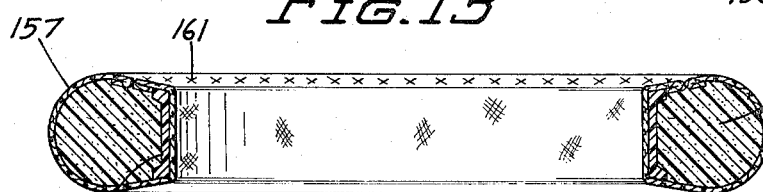
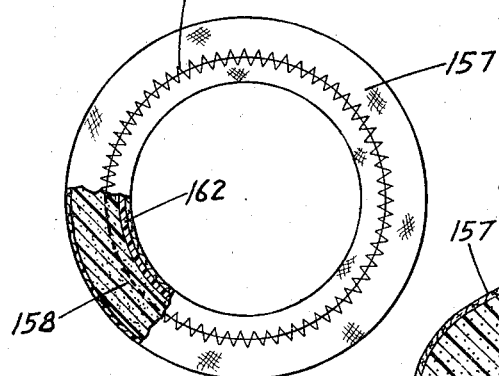
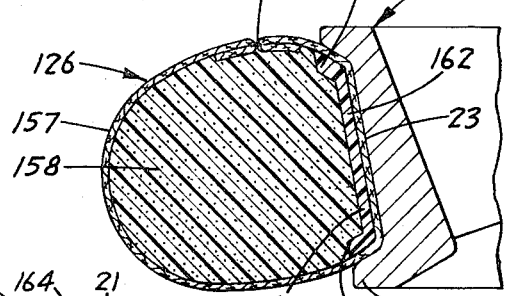
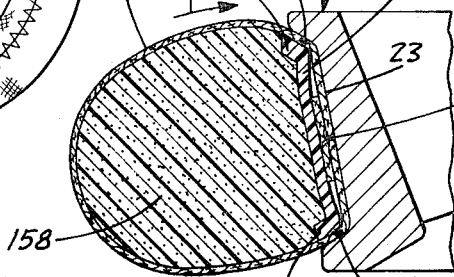
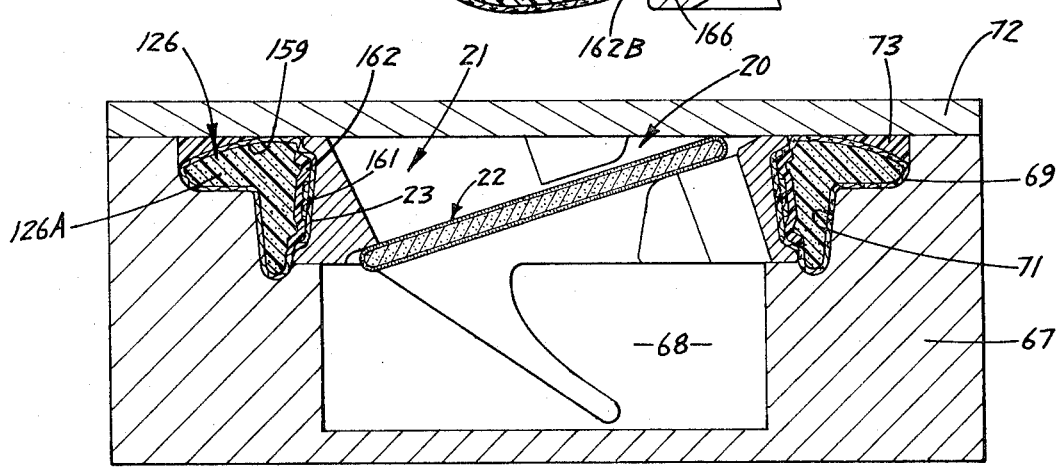

METHOD OF MAKING A SUTURING MEMBER AND MOUNTING THE SUTURING MEMBER ON A DEVICE

BACKGROUND OF THE INVENTION

Clinical uses of prosthetic devices having suturing members for attaching the devices to tissue show that it is advantageous to move the device relative to the suturing member after the suturing member has been attached to the tissue. Kaster in U. S. Pat. No. 3,476,143 discloses a pivoting disc heart valve having a disc that angularly moves to open and closed positions. When the disc is in the open position, it is inclined at a slight angle so as to provide some direction to the centralized flow of blood leaving the valve. During the implant procedure of a pivoting disc heart valve, it is often desirable to adjust the angular position of the valve after it is implanted. The base of the valve is rotated relative to the suturing member secured to the heart tissue to orient the disc away from calcifications that could interfere with the free movement of the disc and to direct the flow of blood in a selected direction. The valve base is rotated relative to the suturing member with a holder or handle used to position the valve during the implant procedure. Heretofore, in order to permit angular orientation of the valve after implantation the suturing member was provided with a relatively loose fit on the valve base. The loose relationship between the suturing member and the valve base is undesirable because in use the valve may shift or slide relative to the suturing member and blood can accumulate adjacent the valve.

Suturing members are retained on the bases or housings of the heart valves in a number of ways. A clamp ring and wire is disclosed in U. S. Pat. No. 3,099,016 to hold the sewing ring on the valve base. A stainless steel ring encased in porous material is used in U. S. Pat. No. 3,396,409 to hold the porous material on the base of the heart valve. Child in U. S. Pat. No. 3,623,212 discloses a suturing member on a device. The cover is held on the valve base with a plurality of cords or threads. The threads are wound in relatively close and tight relationship and inhibit effective rotation of the valve base relative to the suturing member once the threads are tied. The threads do not provide for substantially even holding force across the entire width of the suturing member whereby portions of the suturing member can separate from the valve base.

SUMMARY OF THE INVENTION

The invention is directed to a suturing member for an implantable device, as a heart valve, and a method of making the suturing member on the device. The suturing member is an annular suturing ring or collar that is mounted on a device in a manner that allows for circumferential movement or rotation of the device after the suturing member has been attached to the tissue. The suturing member has a cover located around a core of plastic material. The cover can be a seamless cylindrical fabric member. Located within the cover is an annular sleeve or tubular member of heat shrinkable plastic material. The sleeve is heat shrunk to provide a uniform contraction force to hold the suturing member on the device. The annular seam of the cover is located between the sleeve and the device, whereby the exposed portions of the cover are continuous or seamless. The suturing member is made by enclosing the core and sleeve within the cover. This assembly is then placed about the device, shaped and heat cured in a mold. During the curing, the core is bonded to the inside of the cover and the sleeve is heat shrunk about the device.

An object of the invention is to provide an implantable device with a suturing member that permits rotation of the device after the suturing member has been attached to the tissue. Another object of the invention is to provide a suturing member that does not have any seams exposed to the tissue and that does not separate from the device. A further object of the invention is to provide a method of making a suturing member on a device which uniformly holds the suturing member on the device and bonds the core material and suturing member to the cover. Still a further object of the invention is to provide a suturing member which can be formed on a device in a variety of shapes and which can be applied to many types of implantable devices.

IN THE DRAWINGS

FIG. 1 is a top plan view of a heart valve and a suturing member of the invention mounted on the base of the heart valve;

FIG. 2 is a sectional view taken along the line 2—2 of FIG. 1;

FIG. 3 is an enlarged sectional view of a portion of the base of the heart valve and suturing member;

FIG. 4 is an enlarged sectional view of an outer edge portion of the valve disc;

FIG. 5 is a foreshortened plan view of a blank of the fabric cover of the suturing member;

FIG. 6 is a perspective view of the fabric cover in cylindrical form;

FIG. 7 is a transverse sectional view of the cylindrical cover around an annular core of uncured plastic material positioned adjacent the outside of a heat shrinkable sleeve;

FIG. 8 is a view similar to FIG. 7 showing the cover enclosing the core and sleeve with the cover seam on the inside of the suturing member;

FIG. 9 is a reduced scale sectional view taken along the line 9—9 of FIG. 8;

FIG. 10 is a sectional view of the suturing member mounted on the base of a heart valve prior to forming and curing of the core of plastic material and heat shrinking of the sleeve;

FIG. 11 is a sectional view showing the heart valve and suturing member located in the forming, heat shrink and curing mold for the suturing member;

FIG. 12 is a perspective view of a seamless cylindrical fabric cover of a modified suturing member of the invention;

FIG. 13 is a transverse sectional view of the cylindrical cover around an annular core of uncured plastic material located adjacent the outside of a heat shrinkable sleeve;

FIG. 14 is a view similar to FIG. 13 showing the cover enclosing the core and sleeve;

FIG. 15 is a reduced scale plan view, partly sectioned, of FIG. 14;

FIG. 16 is a sectional view of the suturing member mounted on the base of a heart valve prior to positioning of the cover;

FIG. 17 is a view similar to FIG. 16 showing the cover seam positioned behind the sleeve; and FIG. 18 is a sectional view showing the heart valve and suturing member located in the forming, heat shrink and curing mold for the suturing member.

Referring to the drawings, there is shown in FIGS. 1 to 4 a heart valve 20 for controlling the flow of blood. Valve 20 has a base or annular housing 21 associated with a movable disc 22 to control the flow of blood through the base. Disc 22 is a valving member or occluder that angularly moves from a closed position, shown in full lines in FIG. 2, to an open position, shown in broken lines, and back to the closed position in response to differential blood pressure on opposite sides of the valve. Disc 22 is retained in free floating relationship with the base 21 whereby it is free to rotate about its center axis as it shifts and angularly moves between its open and closed positions. The rotation of the disc as it pivots eliminates localized sites of wear and fatigue by avoiding localized or isolated breakdown of the valve structure. As shown in FIG. 2, when the disc is in the open position, the blood is free to flow adjacent opposite sides of the disc 22. The blood flowing adjacent opposite surfaces of the disc washes the disc without a temporary sinus on the distal side of the disc.

Base 21 has an outer annular side wall 23. Wall 23 has a cylindrical surface located between an upper outwardly directed annular flange 24 and a lower outwardly directed annular flange 25. A suturing member, or sewing collar, indicated generally at 26 surrounds side wall 23 to provide structure for receiving sutures used to attach the valve to the heart tissue. Suturing member 26 is mounted on base 21 in a manner so that base 21 can be rotated relative to the suturing member 26 after the member has been attached to the heart tissue. This permits the surgeon to adjust the angular position of the valve after it has been implanted in the heart. Pivoting disc 22 can be oriented away from calcifications which may interfere with the free movement of disc 22. As shown in FIG. 2, when disc 22 is in the open position, it is at a slight angle relative to the longitudinal axis of passage 28. The angularly positioned disc directs the outflowing blood at a slight angle. The direction of the outflowing blood can be changed by the surgeon by rotation of the valve base relative to the attached suturing member 26, thereby providing optimum direction of the centralized flow pattern of the blood.

Base 21 has an inside, generally cylindrical wall 27 surrounding a passage or opening 28 through the base. Disc 22 is positionable in or operatively located in passage 28 to permit free centralized and streamlined flow of blood through passage 28 when the disc 22 is in the open position and restrict reverse flow of blood through the passage 28 when the disc 22 is in the closed position. Disc 22 is a flat circular member having a circular continuous or uninterrupted outer peripheral edge 29. The outer peripheral edge 29 has an annular uninterrupted circumferential configuration and is joined to a substantially flat top or distal surface 31 and a substantially flat bottom or proximal surface 32.

Referring to FIGS. 1 and 2, the disc 22 is slightly smaller than the diameter of the opening 28 when the disc is in the closed position. This leaves a small annular space 33 between the outer peripheral edge 29 and the adjacent circumferential portion of the inside wall 27 of the base. This annular space 33 permits limited reverse flow of blood through the valve opening 28 past the edge 29 when the disc 22 is in the closed position. Reverse flow of blood prevents stagnation of blood in pockets or pools adjacent the valve base as the blood is continuously moving through passage 28.

Pivot structures, indicated generally at 34 in FIG. 1, cooperate with the disc 22 to control its pivotal movement and limit its open and closed positions. Pivot structures 34 provide the disc 22 with a pivot axis that is offset from the diameter of passage 28 so that when the disc is in the open position, there is free centralized flow of blood through passage 28. The pivot axis for the disc 22 generally follows an imaginary or reference chord line approximately an equal distance between the center of passage 28 and the inside wall 27 measured along a transverse diametrical line, as section line 2—2 in FIG. 1. The pivotal axis of the disc can vary, or shift, relative to the center of the disc during the opening and closing episodes as the disc 22 has limited movement in its plane and in a direction normal to the plane of the disc.

Pivot structures 34 comprise upper or distal members or elements 36 and 37 located adjacent circumferentially spaced portions of the distal side of the disc 22 and project into opening 28. Located generally adjacent the upper members 36 and 37 are lower or proximal members or elements 38 and 39. Members 38 and 39 project into passage 28 and extend adjacent circumferentially spaced portions of the proximal side 32 of the disc 22. Pivot members 36 and 38 are pairs of projections or legs having pivot surfaces which function as fulcrums for the disc 22 during its opening and closing movements. Members 37 and 39 are a second pair of projections or legs having pivot surfaces for the disc during its opening and closing movements. The pivot surfaces of the pairs of legs cooperate with each other to define the pivoting and free floating movement of the disc.

As shown in FIG. 1, the outer peripheral edge 29 of the disc 22 is spaced from the inside wall portions of the base 21 between the pairs of legs 36,38 and 37,39 with spaces 33A. Spaces 33A permit limited reverse flow of blood through the pivoting regions of the valve. Reverse flow prevents clot buildup and freezing at the pivoting areas. The reverse flow also washes the pivoting or fulcrum surfaces on the legs, thereby preventing clot formation on these surfaces. The washing of the pivotal regions is also aided by the rotation of the disc about its axis. The fluid boundary layer on the disc is swept past the pivoting surfaces.

Members 37 and 39 are identical to members 36 and 38. The following detailed description is limited to members 36 and 38 since members 37 and 39 have the same detailed structure. As shown in FIG. 2, proximal pivot member 38 has a round fulcrum corner 41 joined to a top inclined face 42 and a generally upright face 43. Pivot member 36 has a fulcrum corner 44 facing the top face of disc 22 joining the top inclined face 46 and generally upright face 47. Faces 43 and 47 are generally parallel to each other. When disc 22 is in the closed position, face 46 is spaced from the distal surface 31 of the disc. This permits the disc 22 to float up and with the blood away from face 42 during the initial opening movements of the disc 22. Midway between the lower members 38 and 39 is an upwardly directed stop or abutment 48 on housing 21 adapted to engage an outer peripheral portion of disc 22. The lower members 38 and 39 and stop 48 serve to support the disc in a generally inclined position with respect to the longitudinal axis of the passage 28 when the disc is in the closed position. Preferably this incline is about 18° from the horizontal plane of the base.

The disc 22 is maintained in free floating assembled relation with respect to the pivot structures 34 with retaining arms or members 49 and 51. The arms 49 and 51, integral with the top of base 21, project upwardly and are inclined from the base in the direction of pivotal movement of the disc 22. The arms 49 and 51 each have inside surfaces or faces 52 and 53 which have a concave curvature larger than the curve or arc of the outer peripheral edge of the disc 22. The surfaces 52 and 53 curve inwardly toward the center line of the disc, as shown in FIG. 1, and are located outwardly of or above the diameter of the disc 22 so that the disc is retained in assembled relation with the base at all positions between its open and closed positions. The surfaces 52 and 53 follow a helical or spiral path as the radius of the arc of the surfaces 52 and 53 increases toward the outer ends of the arms. The curvature of the surfaces 52 and 53 approaches the curvature of the pivot arc of the disc when the disc is in the closed position. This structure permits the disc to float and move upwardly during its opening episode, as indicated in FIG. 2.

FIG. 4 is an enlarged cross section of a portion of the disc 22 showing the disc substrate 54 entirely covered with a Pyrolite carbon coating or skin 56. A Pyrolite carbon substrate bond 57 firmly and positively joins the coating 56 to the substrate 54. For example, the substrate 54 can be a polycrystalline graphite coated with silicon alloyed Pyrolite carbon. The carbon coating can have a Pyrolite carbon prime layer covered with a Pyrolite carbon finish coat. The silicon-alloyed Pyrolite carbon is deposited at low temperatures in two layers. The thermal coefficient of expansion of the substrate graphite is such that during the cooling after coating, the outer carbon layer is forced into a compressive state of stress which enhances the toughness and wear characteristics of the coating. The Pyrolite carbons are deposited in a fluidized bed from a hydrocarbon containing gaseous environment. These carbons are stronger and tougher than other bulk forms of carbon. The coatings can be applied to a variety of substrates including metal, ceramics and graphite. The substrates can have complex shapes without danger of delamination and cracking.

Referring to FIG. 3, the suturing member 26 has an outwardly directed annular flange 26A and an upwardly directed body terminating in a distal annular ridge 26B. Ridge 26B extends above the top of valve base 21. Suturing member 26 has a cover of fabric made of synthetic fibers, as "Teflon" or "Dacron" cloth or the like. The fabric of cover 57 is biologically inert porous material which can accommodate live tissue ingrowth or fibrosis between the tissue and the porous material. Cover 57 surrounds an elastic core 58 of plastic material, as silicone, Dow Corning "Silastic", fluorosilicone rubber or similar synthetic resinous plastic material. The inside of cover 57 is bonded to the entire outer surface 59 of the core 58, thereby preventing separation of the cover from the core and eliminating voids or pockets which can accumulate blood. The turned edge portions of cover 57 are secured together with stitches 61 forming a seam and are located adjacent the mid-section of the outside wall 23 of valve base 21. An annular circular sleeve, collar, or tubular member 62 is located around the stitched end portions of cover 57 and between the core 58 and the stitched end portions. Sleeve 62 has a width generally equal to the width of the outside wall 23 of the base 21 so as to hold the inside portion of the cover 52 between flanges 24 and 25 in surface engagement with the wall 23. The ends of sleeve 62 have outwardly projected annular portions or ribs 62A and 62B. The ribs 62A and 62B have outwardly diverging outside walls which are generally parallel to adjacent inside faces of flanges 24 and 25. Sleeve 62 provides a uniform circumferential holding force for the cover on the base which permits rotation of the valve base 21 relative to the suturing member 26. Sleeve 62 is preferably of heat shrinkable plastic material, as Teflon, so that when heat shrunk around the valve base 21 it provides a relatively uniform circumferential and longitudinal fit of the suturing member 26 on the base 21. The sleeve 62, being located over the stitched end portions and stitches 61, protects stitches 61 from the sutures used to attach the suturing member 26 to the heart tissue.

Referring to FIGS. 5 to 11, there is shown the process of making and mounting the suturing member 26 on the valve base 21. FIG. 5 shows the cover 57 cut to a rectangular shaped blank of selected size determined by the size of the valve base 21. Preferably, the fabric of cover 57 is cut on a bias, as a 45° angle. The fabric blank then is formed into a cylinder or tube, as shown in FIG. 6. The adjacent ends of cover 57 are stitched together with stitches 63. Cover 57 can be a seamless cylindrical member as shown in FIG. 12.

Referring to FIG. 7, the core 58 of uncured plastic material is placed around the sleeve 62. Sleeve 62 is a tubular member that is pre-shrunk on a cylindrical mandrel to a selected size or diameter. Cover 57 is turned inside out and placed over the core 58 with the ends of the cylinder formed by stitches 63 facing the core. The uncured plastic material 58 can be formed into an elongated roll and uniformly placed around sleeve 62 between ribs 62A and 62B. The plastic material of the core, being uncured and relatively pliable, does not interfere with the placing of cover 57 around the core. Preferably a roll of plastic material is weighed so that a determinant amount of plastic material can be placed around sleeve 62.

Referring to FIG. 8, the upper and lower ends of the cover 57 are turned in and folded over the sleeve 62. This encloses the core 58 and sleeve 62 within cover 57. The ends of cover 57 are stitched together with stitches 61. This places the turned ends or seam of the cover 57 and the stitches 61 midway along the inside of sleeve 62. As shown in FIG. 9, stitches 61 extend circumferentially around the inner side of sleeve 62. Double box stitches 64 and 66 are placed in the cover 57 adjacent the opposite ends of the sleeve 62. The stitches 61 have ends 61A and 61B annularly woven through the cross stitches and extended through the sleeve 62, core 58 and cover 57.

Suturing member 26 is then mounted on valve base 21. This is done by slipping the sleeve 62 and cover 57 over the flange 25 locating the sleeve in groove 23 between flanges 24 and 25. Stitches 61 and the folded ends of cover 57 are located in engagement with the inside wall 23 of the valve base 21. The sleeve 62 is located between flanges 24 and 25, with the ribs 62A and 62B located adjacent the inside portions of flanges 24 and 25 to hold cover 57 in engagement with the cylindrical surface of wall 23. The ends 61A and 61B of stitches 61 are pulled and tied with a slip lock knot adjacent sleeve 62. The ends of stitches 64 and 66 are then pulled and tied to firmly anchor the cover 57 to the valve base adjacent the flanges 24 and 25. Stitches 61, 64 and 66 serve as wrappings to ensure that the suture member 26 will retain its position on the valve base 21 and still permit rotation of the valve base 21 relative to the suturing member 26.

Referring to FIG. 11, there is shown a curing mold 67 for shaping the suturing member 26 and holding the suturing member during curing of the core 58. Mold 67 has a center cavity 68 accommodating valve 20. The upper portion of cavity 68 is enlarged and has an annular stepped groove 69 defining the final shape of suturing member 26. The annular groove 69 is surrounded with an annular stepped wall 71. The cavity 68 and groove 69 are closed with a flat plate or cover 72. Interposed between plate 72 and an outer circumferential portion of the suturing member 26 is a ring 73 which has a shape to provide the annular flange 26A of the suturing member 26 with a tapering or narrower outer peripheral edge. The plate 72 holds the ring in engagement with suturing member 26. Suitable clamp means or fasteners (not shown) secure the plate 72 to mold 67. The pressure exerted by plate 72 and ring 73 on the suturing member 26 forces the pliable uncured plastic core 58 into surface engagement with the fabric of the cover 57. The shape of the annular stepped wall 71 and the surface of the plate 72 along with the shape of ring 73 determines the ultimate shape of suturing member 26. Mitral and aortic suturing members can be made with molds having different shaped grooves and contours.

Suturing member 26 mounted on valve base 21, as shown in FIG. 10, is pressed into mold groove 69. This changes the shape of suturing member 26 conform to the shape of the mold groove 69. As shown in FIG. 11, the suturing member 26 is positioned in the groove with a light force fit so that cover 57 is in continuous engagement with the plastic core 58. The uncured plastic core 58 is cured by heating the mold for a period of time. For example, suturing member 26 is heated for about 20 minutes at 250° F. Other temperatures and times are used in accordance with the heat curing characteristics of the plastic. During heat curing, the core 58 bonds to the inside surface of the cover to form a continuous and permanent connection or bond 59 between the core 58 and cover 57. The bond 59, being continuous, eliminates pockets or spaces between the cover 57 and core 58. Also, the bond eliminates the possibility of separation of the cover 57 from the core 58 which can provide space for collection of blood and other body fluids. During the heat curing process, the core 58 does not penetrate the porous fabric or cover 57. Accordingly, the plastic core does not interfere with tissue ingrowth into the porous fabric of cover 57. The heating of the suturing member also heat shrinks the sleeve 62. As sleeve 62 shrinks, it reduces in its circumferential length and uniformly contracts or decreases in diameter about the valve base 21. This forces the inside portions of cover 57 into a firm and uniform frictional engagement with the surface 23 of the valve base 21. The folded portions of cover 57 behind sleeve 62 causes the mid-portion of the sleeve to flex outwardly putting longitudinal pressure on flanges 24 and 25. When sleeve 62 is subjected to heat it also elongates in the longitudinal direction forcing ribs 62A and 62B toward the flanges 24 and 25. This longitudinal expansion of the sleeve 62 holds cover 57 in firm engagement with the flanges 24 and 25, thereby eliminating separation of suturing member from flanges 24 and 25. The width and longitudinal length of the ribs 62A and 62B can be varied to regulate the amount of force exerted by the ends of the sleeve on flanges 24 and 25. In other words, the amount of material in the ribs 24 and 25. In other words, the amount of material in the ribs 62A and 62B is a function of the force on the cover portions adjacent flanges 24 and 25.

After the plastic core 58 and sleeve 62 are heat cured, the valve 20 and suturing member 26 are removed from the mold 67. The relatively low curing temperature does not have harmful effects on the material of the base or the disc 22. The resultant suturing member 26 has a continuous and seamless exposed cover 57 since stitches 61 are located behind the heat shrunk sleeve 62. The suturing member 26 is firmly mounted on the base 21 and permits rotation of the base 21 relative to the suturing member.

Referring to FIGS. 13 to 18, there is shown another method of making and assembling a suturing member indicated generally at 126 on a valve base or housing 21. The suturing member 126 has a cover 157. As shown in FIG. 12, cover 157 is a seamless cylindrical member of tube cut to a length determined by the type, size and shape of the suturing member. Cover 157 is a seamless tubular knitted or woven Dacron fabric or other biologically inert material having mesh, spaces or porosity enabling ingrowth of tissue soon after implantation. The seamless cover 157 eliminates the side seam shown adjacent stitches 63 in FIG. 6, thereby providing an even and continuous outer cover surface.

Referring to FIG. 13, an annular core 158 of uncured plastic material, as Silastic, is placed around the outside of a heat shrinkable sleeve 162. Sleeve 162 is a tubular plastic member, as Teflon, having annular outwardly directed ribs 162A and 162B. Sleeve 162 is pre-shrunk on a cylindrical mandrel to a selected size or diameter. Cover 157 is placed around core 158, thereby positioning core 158 between sleeve 162 and cover 157. The plastic material of the core, being uncured and relatively pliable, does not interfere with the placing of the cover around the core. Core 158 and sleeve 162 are the same as core 58 and sleeve 62 referred to in FIGS. 1 to 11.

Referring to FIG. 14, the upper and lower ends of cover 157 are turned in and folded around the sleeve 162 and core 158. This encloses the core and sleeve within the cover 157. The turned ends of cover 157 are stitched together with stitches 161 adjacent the top side of core 158.

Referring to FIG. 16, the suturing member 126 is then mounted on the valve base 21. This is accomplished by slipping the sleeve 162 and cover 157 over the annular flange 25 to position the sleeve 162 and the cover 157 adjacent the sleeve in the annular groove 23 of the base 21 between flanges 24 and 25.

The cover 157 is then rotated relative to the core 158 and sleeve 162 in the direction of arrow 165 shown in FIG. 17 until the stitches 161 are located in groove 23 behind the sleeve 162. Double box stitches 164 and 166 are then placed in the cover adjacent opposite ends of sleeve 162. The stitches 164 and 166 have ends (not shown) which are pulled and tied together to firmly anchor the cover on the valve base adjacent the flanges 24 and 25. Stitches 164 and 166 serve as wrappings to insure that the suturing member 126 will retain its position on the valve base 21 and still permit rotation of the valve base 21 relative to the suturing member 126 after the suturing member has been attached to the heart tissue.

Referring to FIG. 18, there is shown a curing mold 67 for shaping the suturing member 126 and holding the suturing member during curing of core 158. Mold 67 is identical with the mold shown in FIG. 11 and has a center cavity 68 accommodating the valve 20. The upper portion of cavity 68 is enlarged and has an annular stepped groove 69 defining the final shape of suturing member 126. Annular groove 69 is surrounded by an annular stepped wall 71. Cavity 68 and groove 69 are closed with a flat plate or cover 72. Interposed between plate 72 and the outer circumferential portion of suturing member 126 is a ring 73 which has a shape to provide the annular flange 126A of the suturing member 126 with a tapering or narrowing outer peripheral edge. Plate 72 holds the ring 73 in engagement with the proximal side of the suturing member 126. Suitable clamp means or fasteners (not shown) secure the plate to the mold. The pressure exerted by plate 72 on ring 73 forces the pliable uncured plastic core 158 into surface engagement with the inside surface of the fabric of cover 157. The shape of the annular stepped wall and the surface of the plate along with the shape of ring 73 determine the ultimate shape of suturing member 126. Mitral and aortic suturing members can be made with molds having different shaped grooves and contours.

Suturing member 126 is initially pressed into the mold groove 69 to change the shape of the suturing member to conform to the shape of the mold groove. Suturing member 126 is located in the groove with a light force fit so that the cover 157 is in a continuous engagement with the plastic core 158. Core 158 is cured by heating the mold for a period of time. For example, suturing member 126 is heated for about 20 minutes at 250° F. Other temperatures and times can be used in accordance with heat curing characteristics of the plastic core. During heat curing, the core bonds to the inside surface of cover 157 to form a permanent and continuous connection or bond 159 between the outer surface of core 158 and the inner surface of cover 157. The bond 159, being continuous, eliminates pockets or spaces between the cover and the core. Also, the bond eliminates the possibility of separation of cover 157 from core 158 which can provide space for collection of blood or other body fluids. During the heat curing process, the core 158 does not penetrate the porous fabric or cavities of cover 157. Accordingly, the cured core does not interfere with tissue ingrowth into the porous fabric of cover 157. The heating of the suturing member also further shrinks the sleeve 162. As sleeve 162 shrinks it reduces its circumferential size and uniformly contracts or decreases in diameter about the valve base 21. This forces the inside portions of cover 157 into a firm and uniform frictional engagement with surface 23 of valve base 21. The folded portions of cover 157 behind sleeve 162 causes the mid-portion of the sleeve to flex outwardly putting longitudinal pressure on flanges 24 and 25. When sleeve 162 is subjected to heat, it also elongates in the longitudinal direction forcing ribs 162A and 162B toward the flanges 24 and 25. This longitudinal expansion of the sleeve 162 holds cover 157 in firm engagement with the flanges 24 and 25 thereby eliminating separation of suturing member from flanges 24 and 25. The width and longitudinal length of the ribs 162A and 162B can be varied to regulate the amount of force exerted by the ends of the sleeve on flanges 24 and 25. In other words, the amount of material in the ribs 162A and 162B is a function of the force on the cover portions adjacent flanges 24 and 25.

After core 158 and sleeve 162 are heat cured, valve 20 and suturing member 126 are removed from the mold. The relatively low curing temperature does not have harmful effects on the material of the base 21 or disc 22. The resultant suturing member 126 has a continuous and seamless exposed cover 157 since stitches 161 are located behind the heat shrunk sleeve 162. The cover 157 does not have a longitudinal sleeve as it is formed from a seamless cylindrical or tubular member shown in FIG. 12. The suturing member 126 is firmly mounted on base 21 and allows for rotation of the base relative to the suturing member after it has been attached to the heart tissue.

The embodiments of the invention in which an exclusive property or privilege is claimed are defined as follows:

1. A process of making a suturing member and mounting the suturing member on a device comprising: enclosing within a cover an annular sleeve of heat shrinkable material and a core of uncured plastic material; locating the cover and enclosed sleeve and core around the device; forming the suturing member into a desired shape, and heating the cover and enclosed sleeve and core to heat shrink the sleeve around the device and cure the plastic material of the core.

2. The process of claim 1 wherein: during the forming of the suturing member the uncured plastic material of the core is positioned into engagement with the inside surface of the cover, and during the heating of the cover the plastic material of the core is bonded to the inside surface of the cover.

3. The process of claim 1 wherein: a measured amount of uncured plastic material is positioned adjacent the sleeve and enclosed by the cover.

4. The process of claim 1 including: stitching the cover together to enclose the sleeve and uncured plastic material within the cover.

5. The process of claim 1 including: closing the cover by connecting adjacent end portions of the cover together.

6. The process of claim 5 wherein: the connected adjacent end portions of the cover are located between the sleeve and the device.

7. The process of claim 1 wherein: the suturing member is formed on the device by pressing the suturing member into a mold cavity having the desired shape.

8. The process of claim 1 including: connecting the cover together adjacent one side of the core to enclose the sleeve and core within the cover, and locating the connecting portions of the cover between the sleeve and device after the cover and enclosed sleeve and core are located on the device.

9. The process of claim 1 including: connecting the end portions of the cover together adjacent the inside of the sleeve to enclose the sleeve and core within the cover.

10. A process of making a suturing member and mounting the suturing member on a device having an annular outside portion for holding the suturing member comprising: providing a cover of porous material of a size to be positioned around the device so that part of the cover can be located adjacent the outside portion of the device; locating uncured plastic core material and an annular sleeve of heat shrinkable material adjacent the cover, enclosing the uncured plastic core material and sleeve within the cover in an annular shape, locating the cover and enclosed sleeve and core around the device, forming the suturing member on the device by pressing the cover and enclosed core of plastic material into a desired shape and positioning the uncured plastic material in engagement with the inside surface of the cover, and heating the cover and enclosed core of plastic material and sleeve of heat shrinkable material to cure the plastic material, heat shrink the sleeve and bond the core of plastic material to the inside surface of the cover to maintain the shape of the suturing member.

11. The process of claim 10 wherein: the cover is closed by connecting adjacent end portions of the cover together.

12. The process of claim 10 wherein: the connected adjacent end portions of the cover are located between the sleeve and the annular outside portion of the device.

13. The process of claim 10 wherein: the cover is a seamless cylindrical fabric member.

14. The process of claim 10 including: attaching adjacent end portions of the cover together to enclose the core and sleeve within the cover, and positioning the attached adjacent end portions between the sleeve and outside portion of the device after locating the cover, sleeve and core around the device.

* * * * *

UNITED STATES PATENT OFFICE
CERTIFICATE OF CORRECTION

Patent No. 3,800,403　　　　　　　　Dated April 2, 1974

Inventor(s) Lawrence Anderson, et al.

It is certified that error appears in the above-identified patent and that said Letters Patent are hereby corrected as shown below:

Column 4, line 63, cancel "upwardly", insert -- inwardly --.

Column 7, line 37, after 26 insert -- to --.

Column 8, lines 8, 9 and 10, after 25, cancel "In other words, the amount of material in the ribs 24 and 25".

Signed and sealed this 10th day of September 1974.

(SEAL)
Attest:

McCOY M. GIBSON, JR.　　　　　　　　C. MARSHALL DANN
Attesting Officer　　　　　　　　　　Commissioner of Patents